(12) United States Patent
Michalski et al.

(10) Patent No.: US 8,925,440 B2
(45) Date of Patent: Jan. 6, 2015

(54) HYDRAULIC MODULE INCLUDING A PUMP HOUSING WITH SURFACE-CONNECTED PUMP ELEMENTS

(75) Inventors: Guy Michalski, Charleston, SC (US); Douglas Patterson, Summerville, SC (US); Bernhard Gnamm, Summerville, SC (US)

(73) Assignee: Robert Bosch GmbH, Stuttgart (DE)

( * ) Notice: Subject to any disclaimer, the term of this patent is extended or adjusted under 35 U.S.C. 154(b) by 619 days.

(21) Appl. No.: 13/324,457

(22) Filed: Dec. 13, 2011

(65) Prior Publication Data

US 2013/0145758 A1 Jun. 13, 2013

(51) Int. Cl.
*F01B 1/06* (2006.01)

(52) U.S. Cl.
USPC .................................. 92/148; 92/72

(58) Field of Classification Search
USPC .......... 92/72, 129, 148; 91/491; 417/270, 273
See application file for complete search history.

(56) References Cited

U.S. PATENT DOCUMENTS

| 5,244,262 | A | 9/1993 | Kehl et al. |
| 5,975,652 | A | 11/1999 | Otto |
| 6,234,199 | B1 | 5/2001 | Nohira |
| 6,846,050 | B2 | 1/2005 | Inoue et al. |
| 6,869,152 | B2 | 3/2005 | Weh et al. |
| 7,322,658 | B2 | 1/2008 | Hinz et al. |
| 2007/0176484 | A1 | 8/2007 | Reuter et al. |
| 2008/0106145 | A1 | 5/2008 | Hinz et al. |
| 2010/0207446 | A1 | 8/2010 | Tandler et al. |

FOREIGN PATENT DOCUMENTS

| DE | 19808626 | 9/1999 |
| EP | 0699571 | 3/1996 |
| EP | 0882632 | 12/1998 |
| EP | 1669597 | 6/2006 |
| JP | 2004075052 | 3/2004 |
| JP | 2006035887 | 2/2006 |

OTHER PUBLICATIONS

International Search Report for Application No. PCT/US2012/068928 dated Mar. 15, 2013 (15 pages).

*Primary Examiner* — Michael Leslie
(74) *Attorney, Agent, or Firm* — Michael Best & Friedrich LLP

(57) ABSTRACT

A hydraulic module includes a pump housing with an opening in communication with an exterior surface of the pump housing. A plurality of pump chambers are in communication with the opening. A plurality of pump elements correspond to the plurality of pump chambers, each of the plurality of pump elements being movable within the respective one of the pump chambers to increase the pressure in a fluid from a suction side of the pump chamber to a pressure side of the pump chamber. A motor has an output member extending into the opening of the pump housing and coupled with the plurality of pump elements. A channel is formed in the exterior surface of the pump housing. The channel establishes fluid communication between the plurality of pump chambers.

20 Claims, 13 Drawing Sheets

HYDRAULIC MODULE INCLUDING A PUMP HOUSING WITH SURFACE-CONNECTED PUMP ELEMENTS

BACKGROUND

The present invention relates to hydraulic modules for brake systems. Conventional hydraulic modules include a plurality of motor-driven hydraulic pumps ("pump elements") enclosed within a block-formed pump housing and fluidly coupled with each other via fluid passages machined into an interior of the pump housing. Such a hydraulic module may include a motor secured to a side of the pump housing, and an external accumulator secured to another side of the pump housing. Such a hydraulic module may be used in the braking system of an automobile or other equipment as a pressure unit that generates (and optionally stores) hydraulic fluid pressure for automated braking action (braking not mechanically coupled to driver actuation).

SUMMARY

In one aspect, the invention provides a hydraulic module. A pump housing of the hydraulic module has an exterior surface, an opening in communication with the exterior surface, and a plurality of pump chambers in communication with the opening. A plurality of pump elements correspond to the plurality of pump chambers, each of the plurality of pump elements being movable within the respective one of the pump chambers to increase the pressure in a fluid from a suction side of the pump chamber to a pressure side of the pump chamber. A motor has an output member extending into the opening of the pump housing and coupled with the plurality of pump elements. A channel is formed in the exterior surface of the pump housing. The channel establishes fluid communication between the plurality of pump chambers.

In another aspect, the invention provides a hydraulic module. A pump housing of the hydraulic module has an exterior surface, an opening in communication with the exterior surface, and a pump chamber in communication with the opening. A pump element is movable within the pump chamber to increase the pressure in a fluid from a suction side of the pump chamber to a pressure side of the pump chamber. A motor has an output member extending into the opening of the pump housing and coupled with the pump element. A channel is formed in the exterior surface of the pump housing. The channel is in fluid communication with the pump chamber. A closure generally conforming to the shape of the channel on the exterior surface is positionable in a secured position against the pump housing to enclose the channel. The motor is secured to the exterior surface of the pump housing, and the closure is held in the secured position by being assembled and clamped between the motor and the exterior surface of the pump housing.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
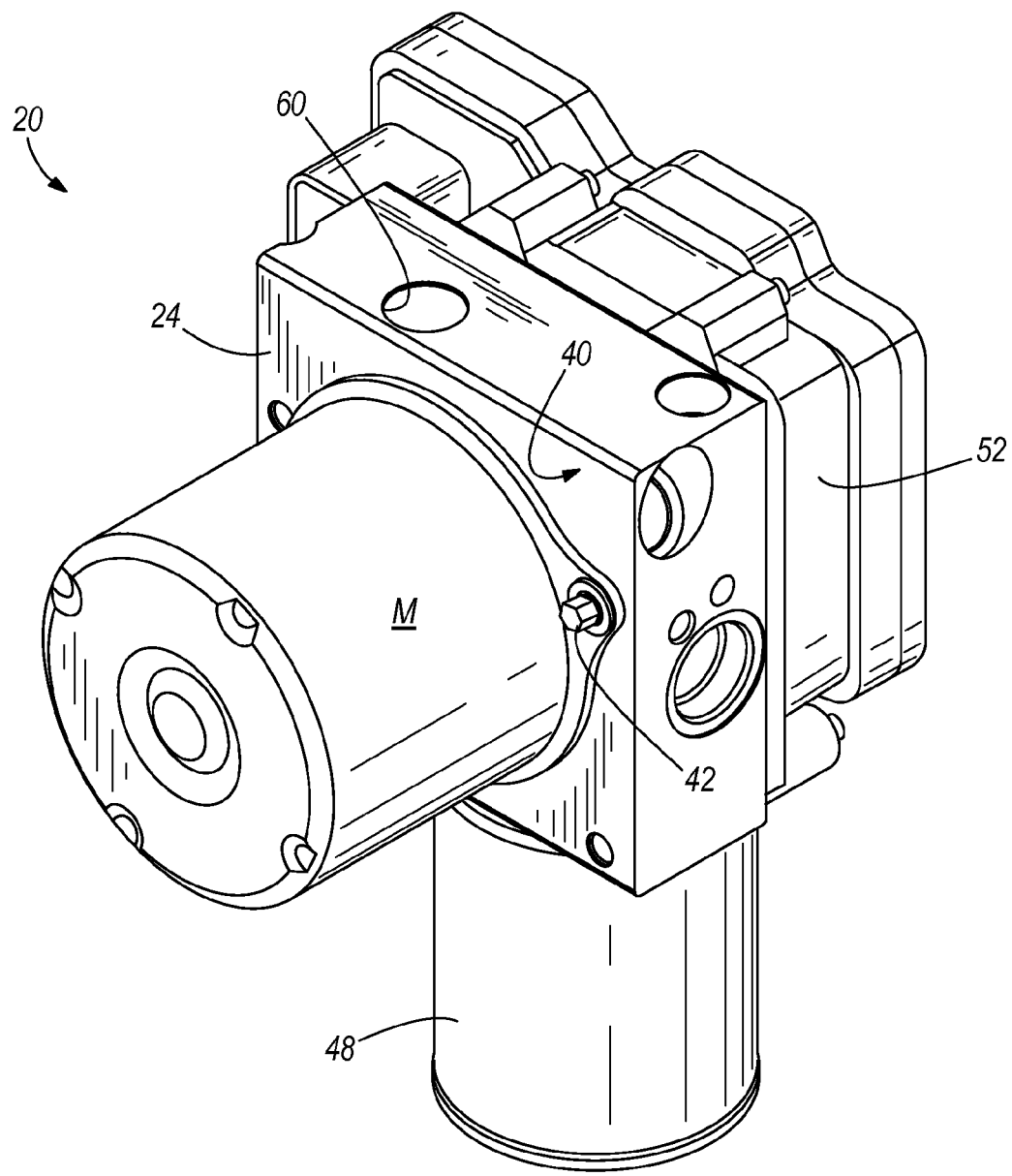
FIG. 1 is a perspective view of a hydraulic module.
Figure 3:
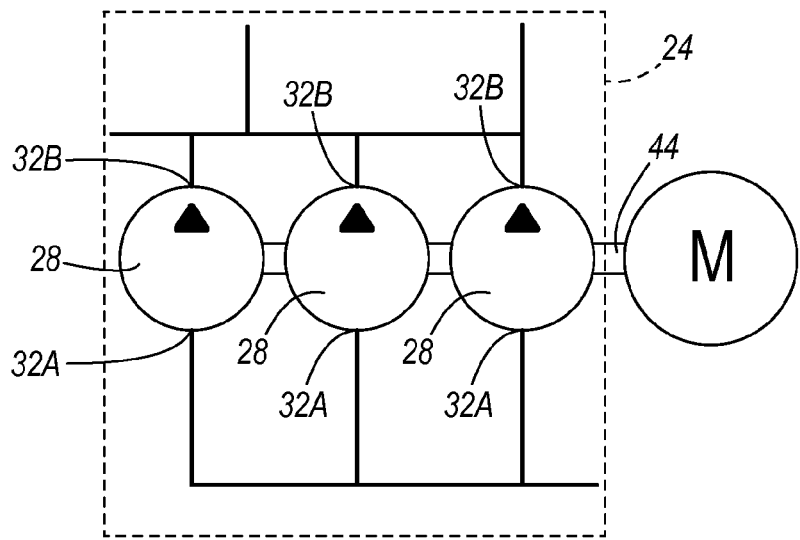
FIG. 3 is a schematic view illustrating the connection of multiple parallel pump elements driven by a single motor.
Figure 6:
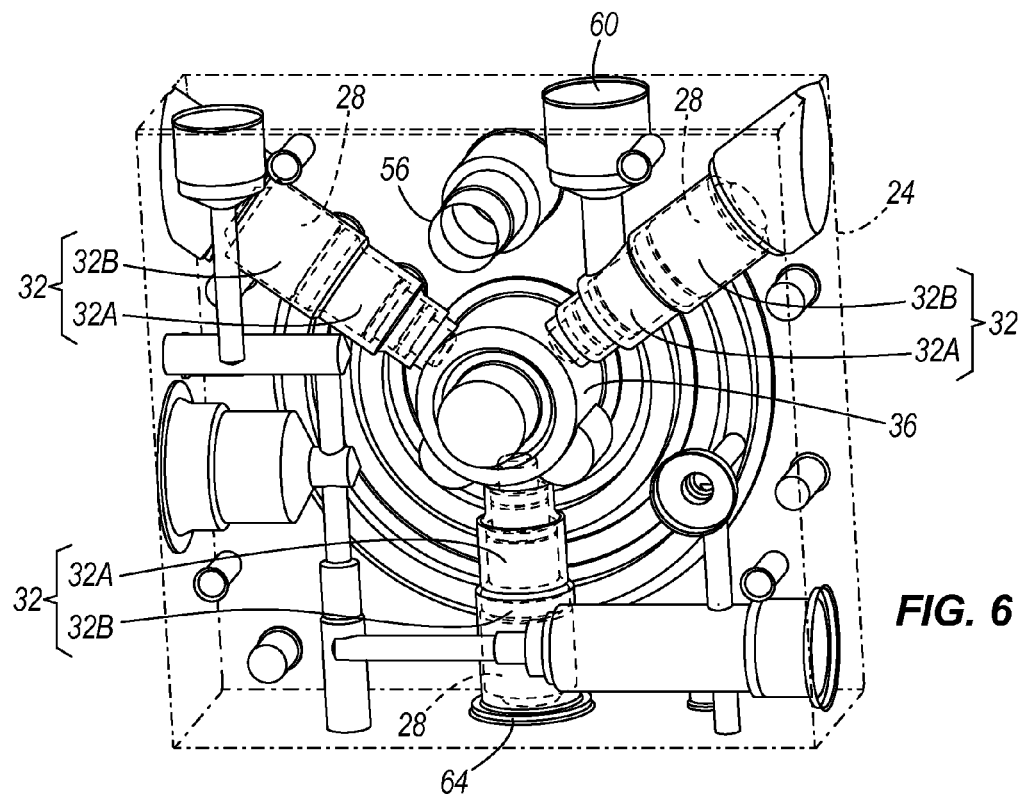
FIG. 6 is a second perspective view of the pump housing of FIG. 4, in which the exterior surfaces are rendered see-through to illustrate the internal passages within the pump housing.

FIG. 1 illustrates a hydraulic unit or module 20. The hydraulic module 20 may be used in the braking system of an automobile or other equipment (not shown) as a pressure unit that generates and stores hydraulic fluid pressure. In some constructions, pressurized hydraulic fluid from the hydraulic module 20 can be released in a controlled manner for automated braking action (i.e., braking not mechanically effected by driver actuation). However, the hydraulic module 20 may have other practical uses as well. The hydraulic module 20 includes a pump housing 24 in which a plurality of pump elements 28 (FIGS. 3 and 6) are disposed. Each of the pump elements 28 is movably received within a corresponding pump chamber 32 formed in the pump housing 24. In the illustrated construction, each of the pump chambers 32 are in communication with a common opening 36. The opening 36 is centrally located with respect to all of the pump chambers 32, and is in communication with an exterior surface 40 of the pump housing 24. The hydraulic module 20 includes three pump chambers 32 radially arranged to the central opening 36 with substantially equal angular spacing in the illustrated construction, but other numbers and arrangements are possible.

Each of the plurality of pump elements 28 is drivably coupled with an output member 44 of a motor M that is coupled to the pump housing 24 (e.g., at the exterior surface 40 with fasteners 42). The output member 44 extends into the opening 36 to establish driving contact with each of the plurality of pump elements 28, directly or through any desired type of connection mechanism. Each of the pump elements 28 is movable within the respective pump chamber 32, in response to rotation of the motor output member 44 to increase the pressure in a fluid from a suction side 32A of the pump chamber 32 to a pressure side 32B of the pump chamber 32. Some or all of the pressurized hydraulic fluid from the pressure side 32B of each pump chamber 32 can be provided to an accumulator 48. In the illustrated construction, the accumulator 48 is coupled directly to the pump housing 24 at a surface adjacent the exterior surface 40 where the motor M is coupled.

An electronic control module 52, which is electrically coupled to the motor M to provide a drive signal thereto, is also coupled to the pump housing 24. In the illustrated construction, the electronic control module 52 is coupled to the pump housing 24 at a side opposite the side of the exterior surface 40 where the motor M is coupled. A pair of power leads (not shown) of the motor M are coupled to the electronic control module 52 and extend through the pump housing 24 via an aperture 56 formed therein.

Figure 2:
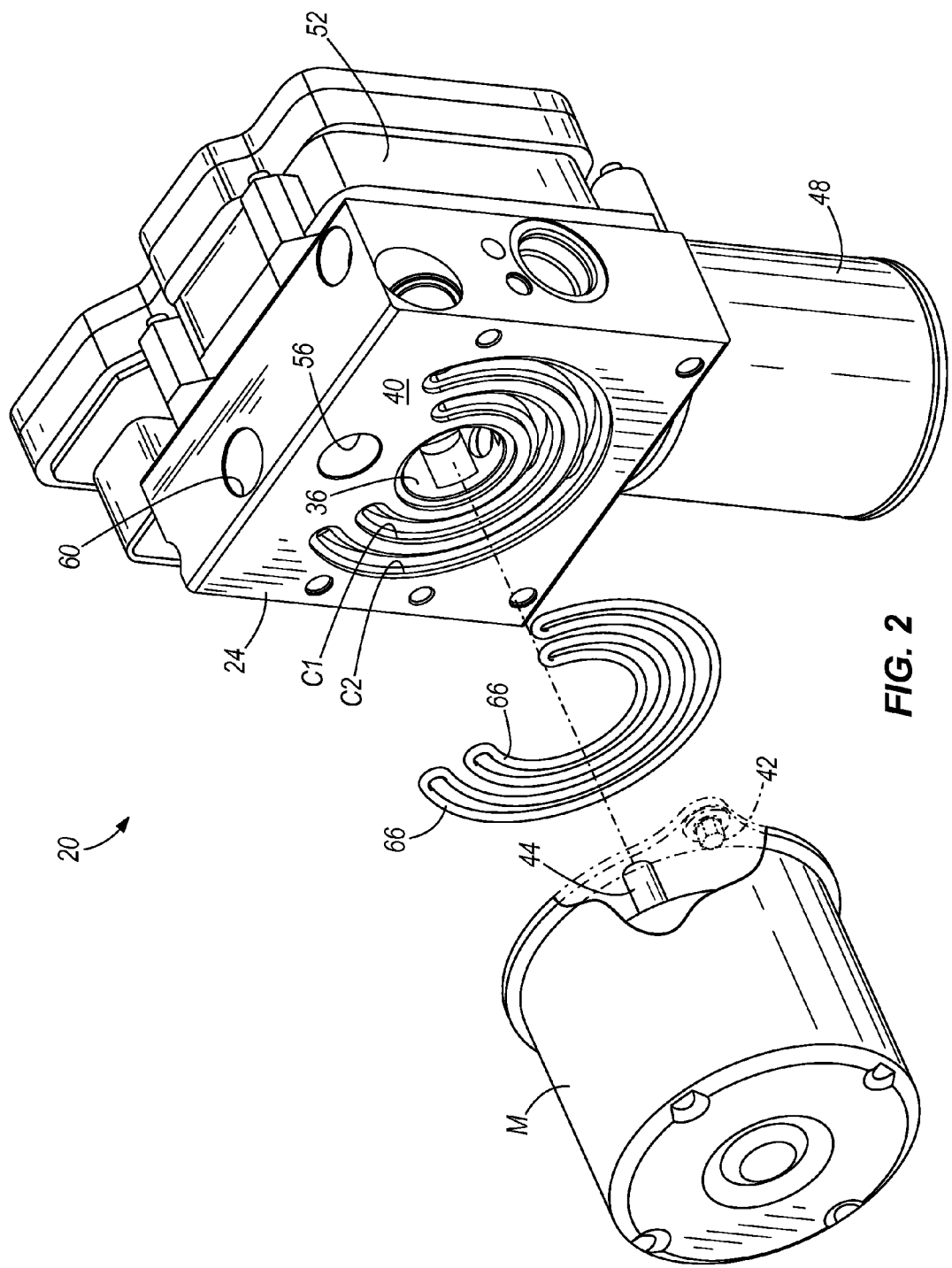
FIG. 2 is an exploded assembly view of the hydraulic module of FIG. 1.
Figure 4:
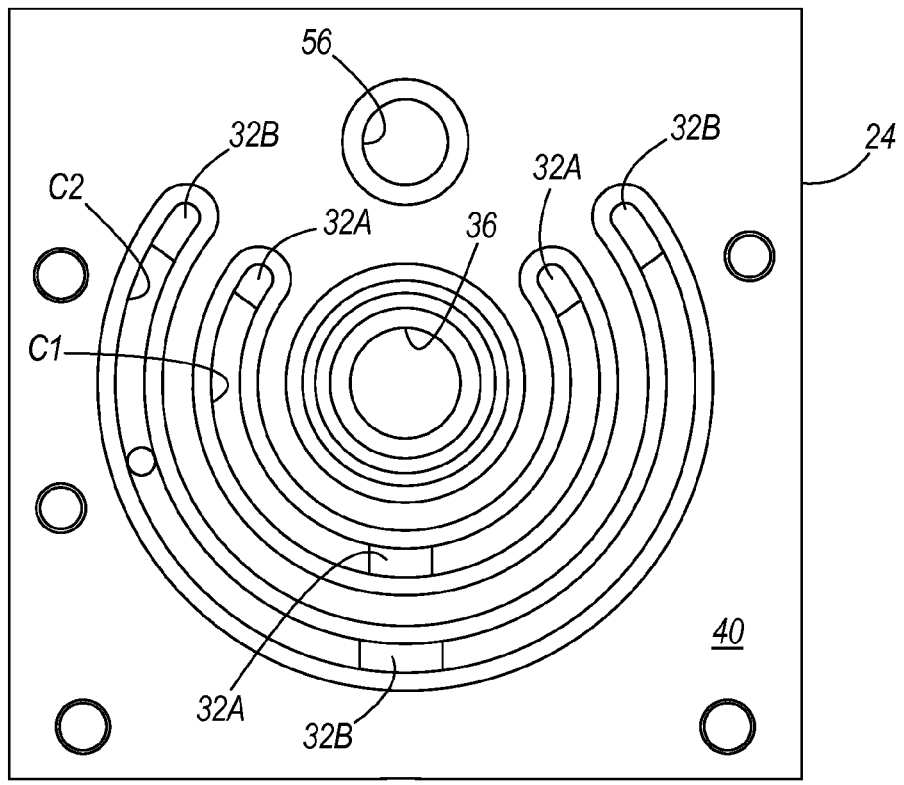
FIG. 4 is a front side view of a pump housing of the hydraulic module of FIGS. 1-2. The pump housing includes two surface channels of about 270 degrees.
Figure 5:
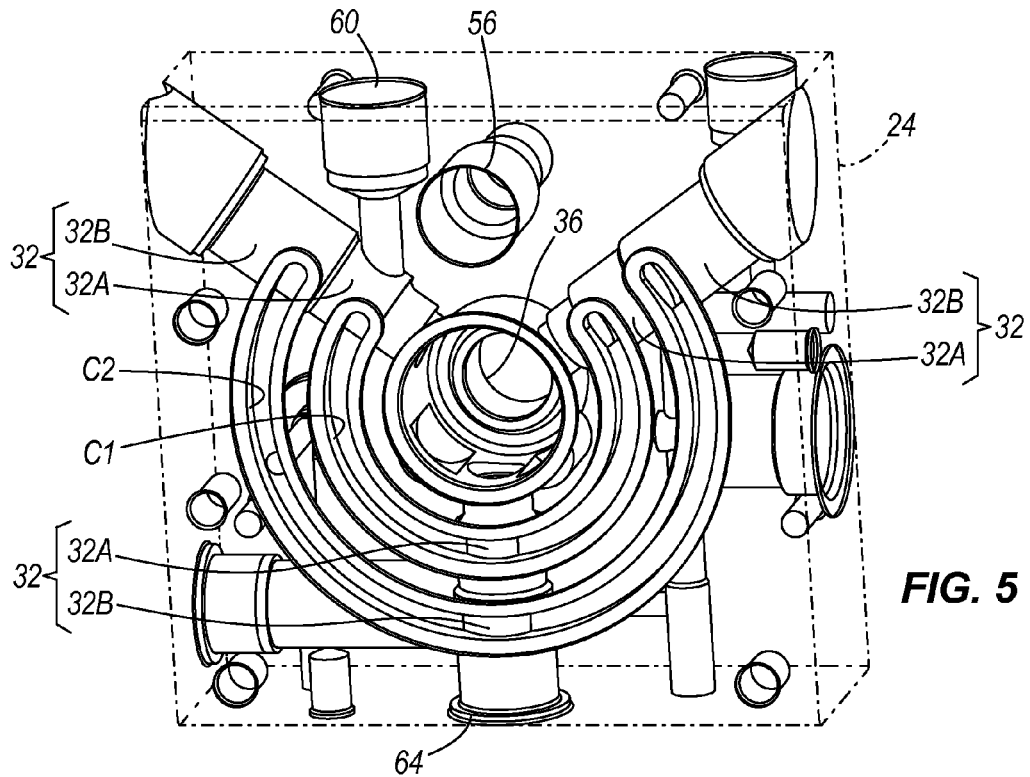
FIG. 5 is a first perspective view of the pump housing of FIG. 4, in which the exterior surfaces are rendered see-through to illustrate the internal passages within the pump housing.

As shown in FIGS. 2 and 4, a first channel C1 is formed in the exterior surface 40 of the pump housing 24. The first channel C1 is in fluid communication with the suction side 32A of each pump chamber 32 and establishes fluid communication among the plurality of pump chambers 32. Likewise, a second channel C2 is formed in the exterior surface 40 of the pump housing 24 adjacent the first channel C1. The second channel C2 is in fluid communication with the pressure side 32B of each pump chamber 32 and establishes fluid communication among the plurality of pump chambers 32. In the illustrated construction, the first and second channels C1, C2 are concentric, arcuate channels of at least 180 degrees (e.g., about 270 degrees), centered about the opening 36, but other arrangements are optional, some of which are also illustrated and described in detail further below. In the illustrated construction, it can also be noted that one or both of the channels C1, C2 is located on an arcuate path that intersects the aperture 56 that receives the power leads of the motor M. The aperture 56 is positioned generally between the respective ends of the first channel C1 and generally between the respective ends of the second channel C2.

Because the channels C1, C2 couple all of the suction sides 32A and all of the pressure sides 32B, respectively, the pump housing 24 can be provided with a single pumping inlet or supply port 60 and a single pumping outlet or discharge port 64. If the pump elements 28 are configured to supply an accumulator (48 as shown in FIGS. 1 and 2), the discharge port 64 can be coupled directly or indirectly with the accumulator 48. The channels C1, C2 formed at the exterior surface 40 not only reduce the requirement for multiple external inlet and outlet ports, but also obviate the need for internally-formed passages to couple the respective pump chambers 32. This makes the manufacturing of the pump housing 24 significantly simpler and less costly.

A seal member 66 is positioned in or adjacent each of the channels C1, C2 as shown in FIG. 2. In the construction of FIG. 2 where each channel C1, C2 extends along an arcuate path less than 360 degrees, a single seal member 66 (e.g., a contorted O-ring) can be provided for each channel C1, C2. The circumference of each seal member 66 corresponds to the perimeter length of the respective channel C1, C2. The motor M, by itself or in combination with one or more additional elements as described in further detail below, may serve as a closure member(s) for sealing the channels C1, C2 from the outside atmosphere.

FIGS. 7-10 illustrate an alternate construction of a hydraulic unit or module 120, which is similar in most respects to the hydraulic unit 20 of the preceding description and accompanying drawings. Similar reference characters are used where appropriate, and the description of the hydraulic module 120 is focused on the unique features thereof, with the understanding that features or alternatives not specifically addressed are similar to the hydraulic module 20 already described.

The hydraulic module 120 includes a pump housing 124 in which a plurality of pump elements are provided (movably in corresponding pump chambers 32). The pump chambers 32 are radially arranged about a central opening 136. The opening 136 is open to an exterior surface 140 of the pump housing 124 on which the pump-driving motor M is provided. Similar to the pump housing 24, each pump chamber 32 includes a suction side 32A and a pressure side 32B. Furthermore, the suction sides 32A of all of the pump chambers 32 are fluidly coupled together with a first channel C3 in the exterior surface 140 of the pump housing 124. Likewise, the pressure sides 32B of all of the pump chambers 32 are fluidly coupled together with a second channel C4 in the exterior surface 140. Contrary to the channels C1, C2 of the pump housing 24, the channels C3, C4 in the pump housing 124 are each annular, extending a full 360 degrees, thus having no particular ends. Four seal members 166 are provided to seal the two channels C3, C4. Each seal member 166 can be an O-ring of a particular size corresponding to either the inside diameter or the outside diameter of one of the channels C3, C4.

Figure 7:
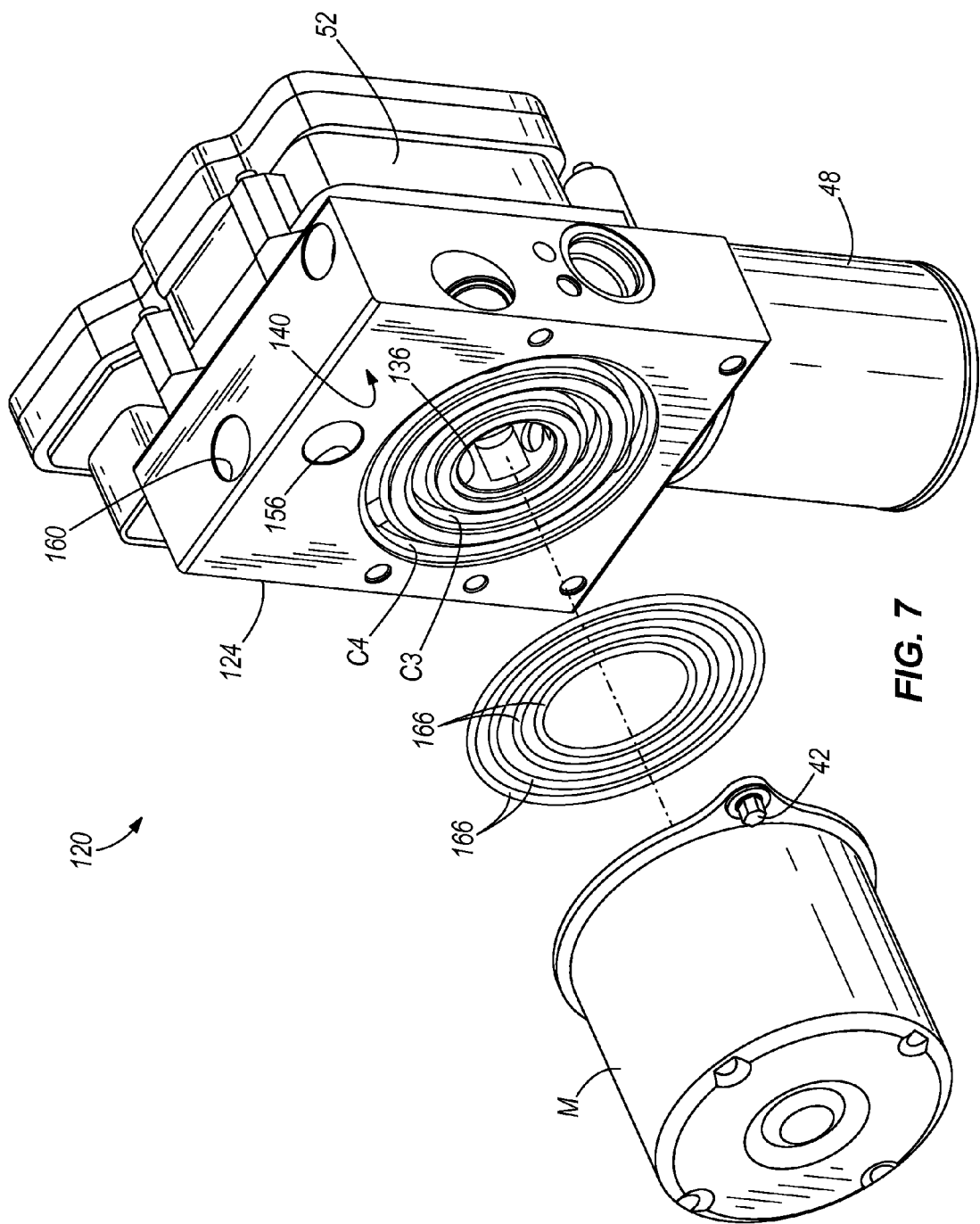
FIG. 7 is an exploded assembly view of a hydraulic module similar to that of FIG. 1 with an alternate pump housing. The pump housing includes two surface channels of 360 degrees.
Figure 8:
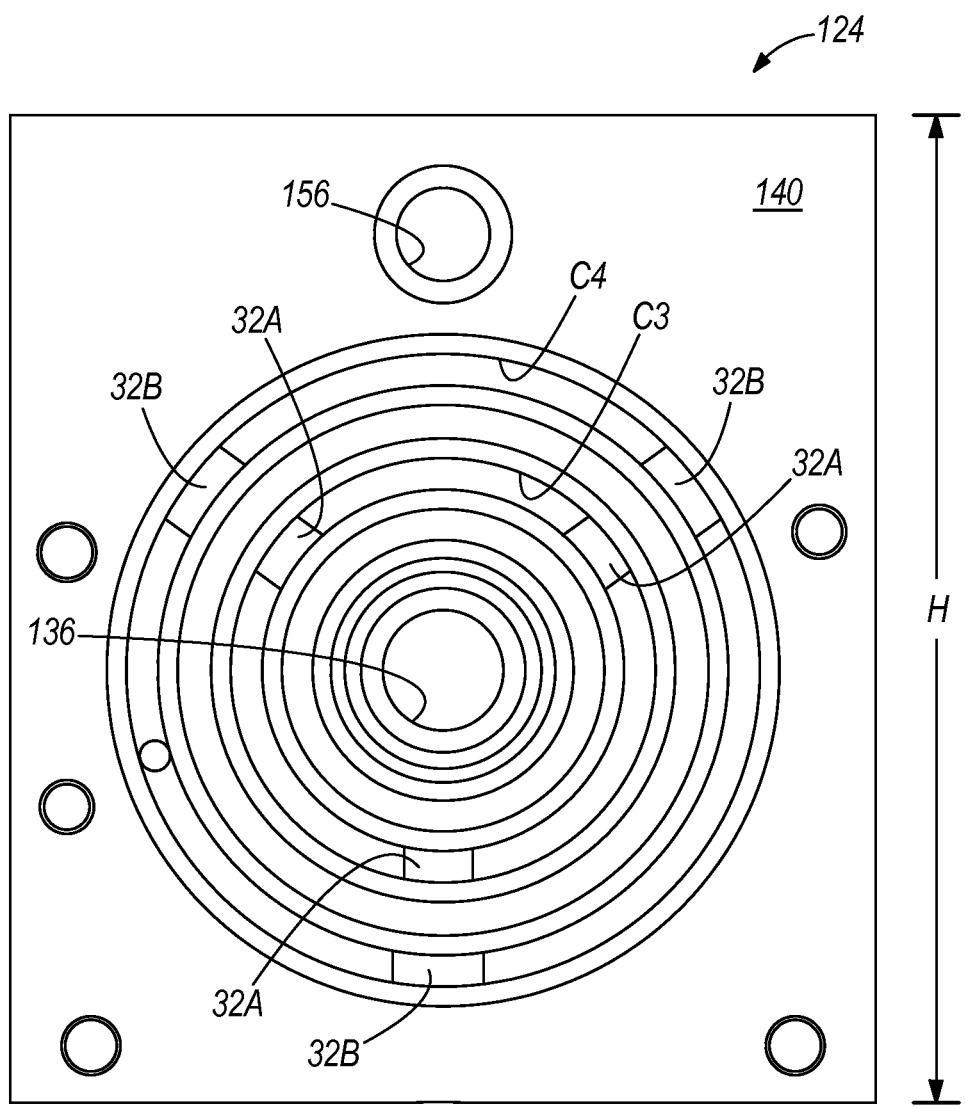
FIG. 8 is a front side view of the pump housing of the hydraulic module of FIG. 7.
Figure 9:
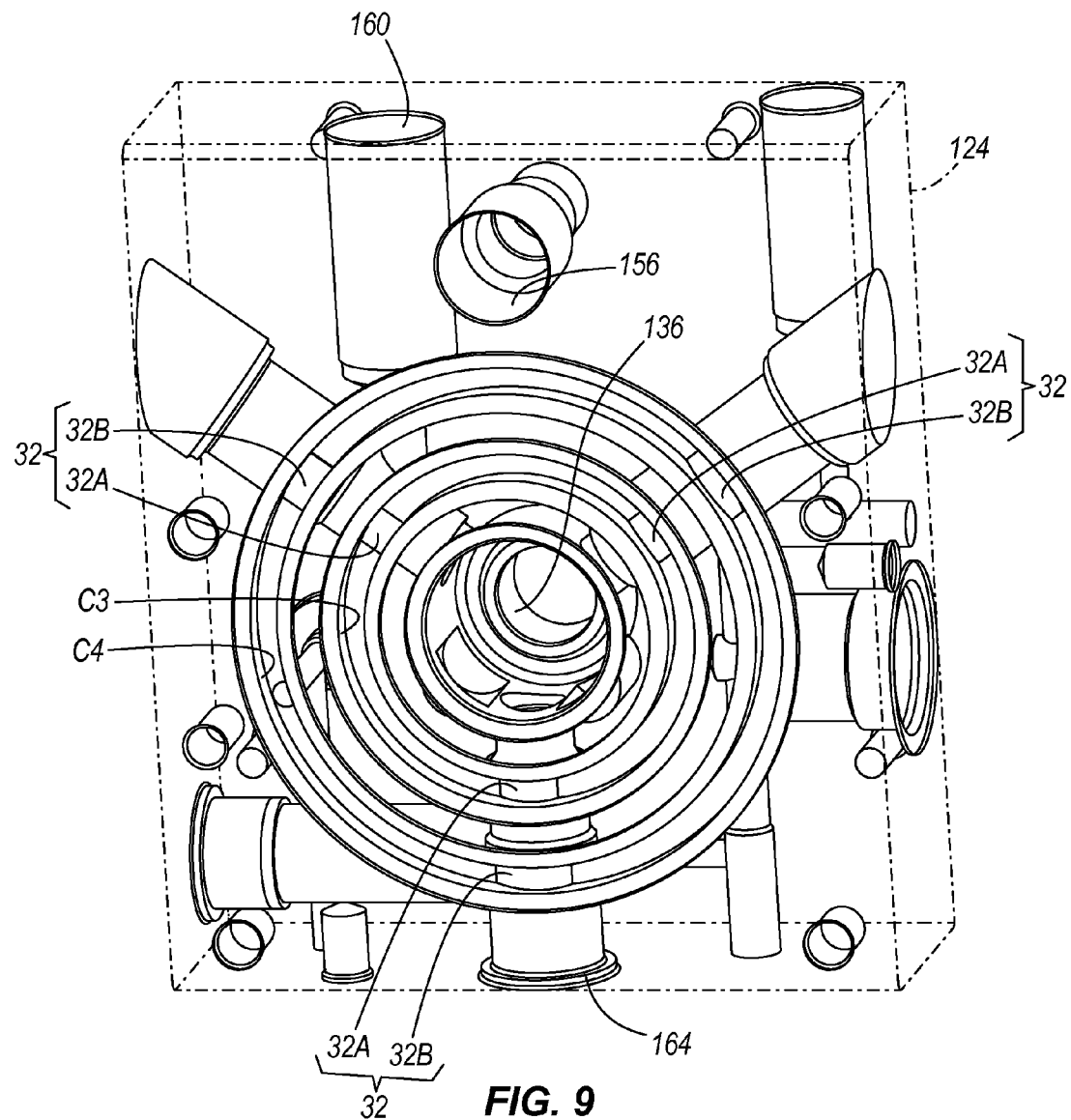
FIG. 9 is a first perspective view of the pump housing of FIG. 8, in which the exterior surfaces are rendered see-through to illustrate the internal passages within the pump housing.
Figure 10:
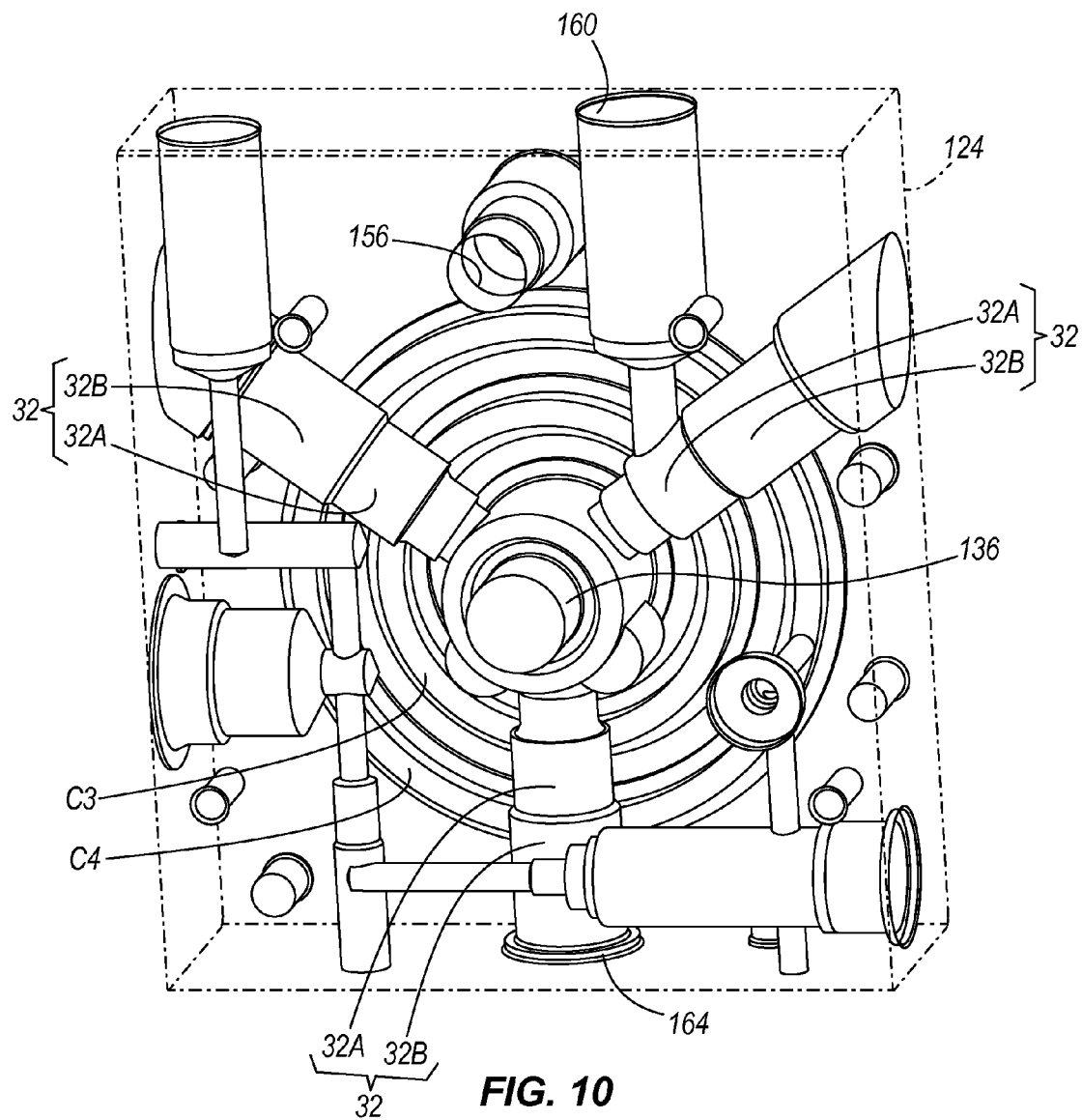
FIG. 10 is a second perspective view of the pump housing of FIG. 8, in which the exterior surfaces are rendered see-through to illustrate the internal passages within the pump housing.

Like the pump housing 24 of the preceding construction, the pump housing 124 can be provided with a single pumping inlet or supply port 160 and a single pumping outlet or discharge port 164. If the pump chamber pressure sides 32B are configured to supply an accumulator (48 as shown in FIG. 7), the discharge port 164 can be coupled directly or indirectly with the accumulator 48. The channels C3, C4 formed at the exterior surface 140 not only reduce the requirement for multiple external inlet and outlet ports, but also obviate the need for internally-formed passages to couple the respective pump chambers 32. This makes the manufacturing of the pump housing 124 significantly simpler and less costly. In contrast to the pump housing 24 of the preceding construction, the pump housing 124 has an enlarged exterior surface 140, corresponding to an increased overall dimension H (FIG. 8) in at least one direction (e.g., "height", vertically as viewed in FIGS. 7-10). The height H is increased so that the aperture 156 that receives the power leads from the motor M (to connect to the electronic control module 52) is spaced from the second (outer) channel C4, and does not intersect therewith. Other arrangements may facilitate full 360-degree channels C3, C4 without increasing the overall height H of the pump housing 124 (e.g., positioning the aperture 156 further toward an exterior edge or a corner of the pump housing 124).

Figure 11:
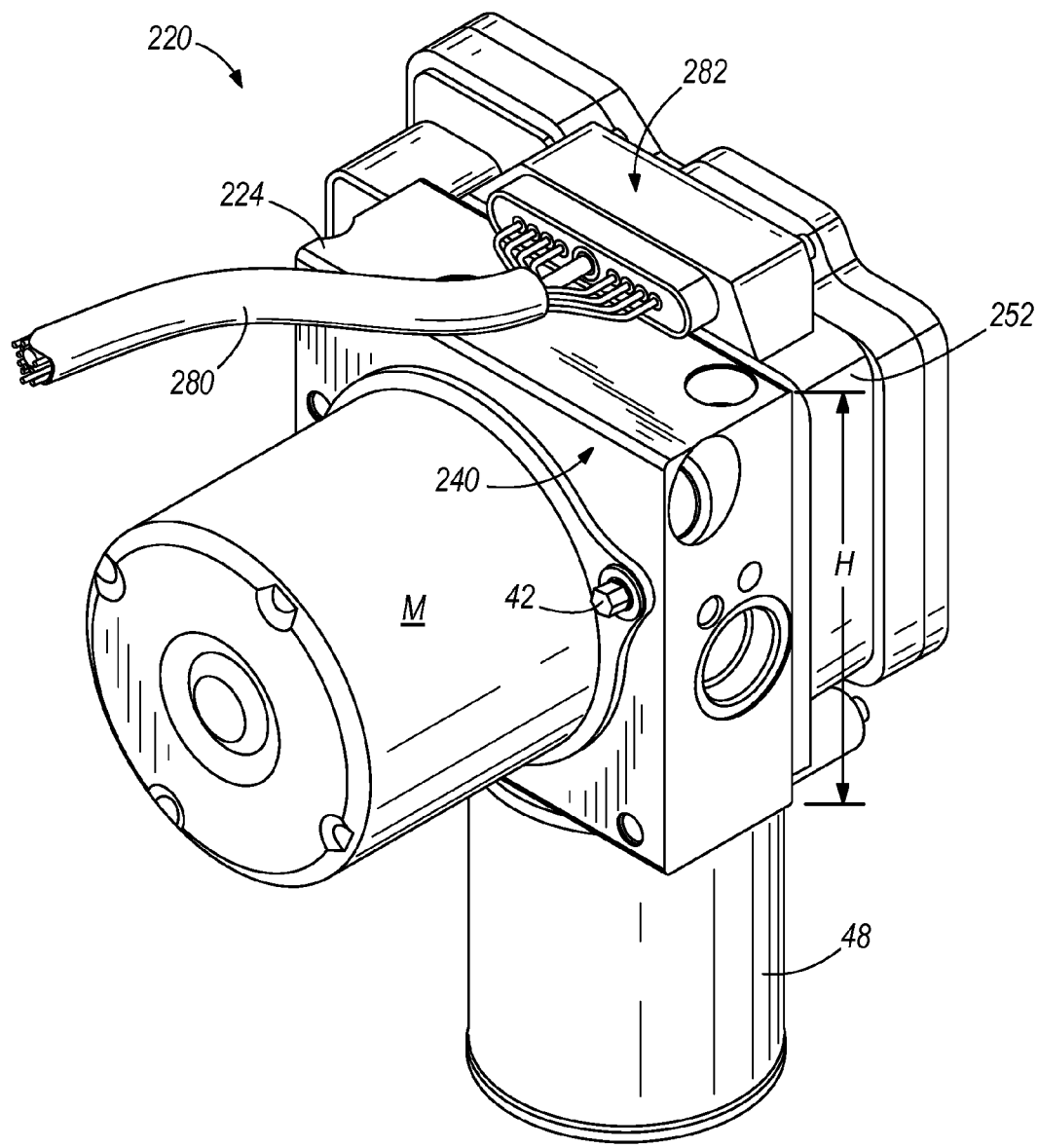
FIG. 11 is a perspective view of a hydraulic module similar to FIG. 1, but incorporating a pump housing with 360 degree surface channels and external power leads for the pump motor.

In a further construction, FIG. 11 illustrates a hydraulic unit or module 220 including a pump housing 224 having two 360-degree channels like the channels C3, C4 of FIGS. 7-10, but omitting the aperture 156 for the motor power leads, so that the overall height H of the pump housing 224 can be kept small, like that of the pump housing 24 which has only the 270-degree channels C1, C2. Rather than extend through the pump housing 224 from the motor M to the electronic control module 252, the power leads (in the form of a multi-wire cable 280) extend externally of the pump housing 224 to a plug-connector interface 282 between the cable 280 and the electronic control module 252.

Figure 12:
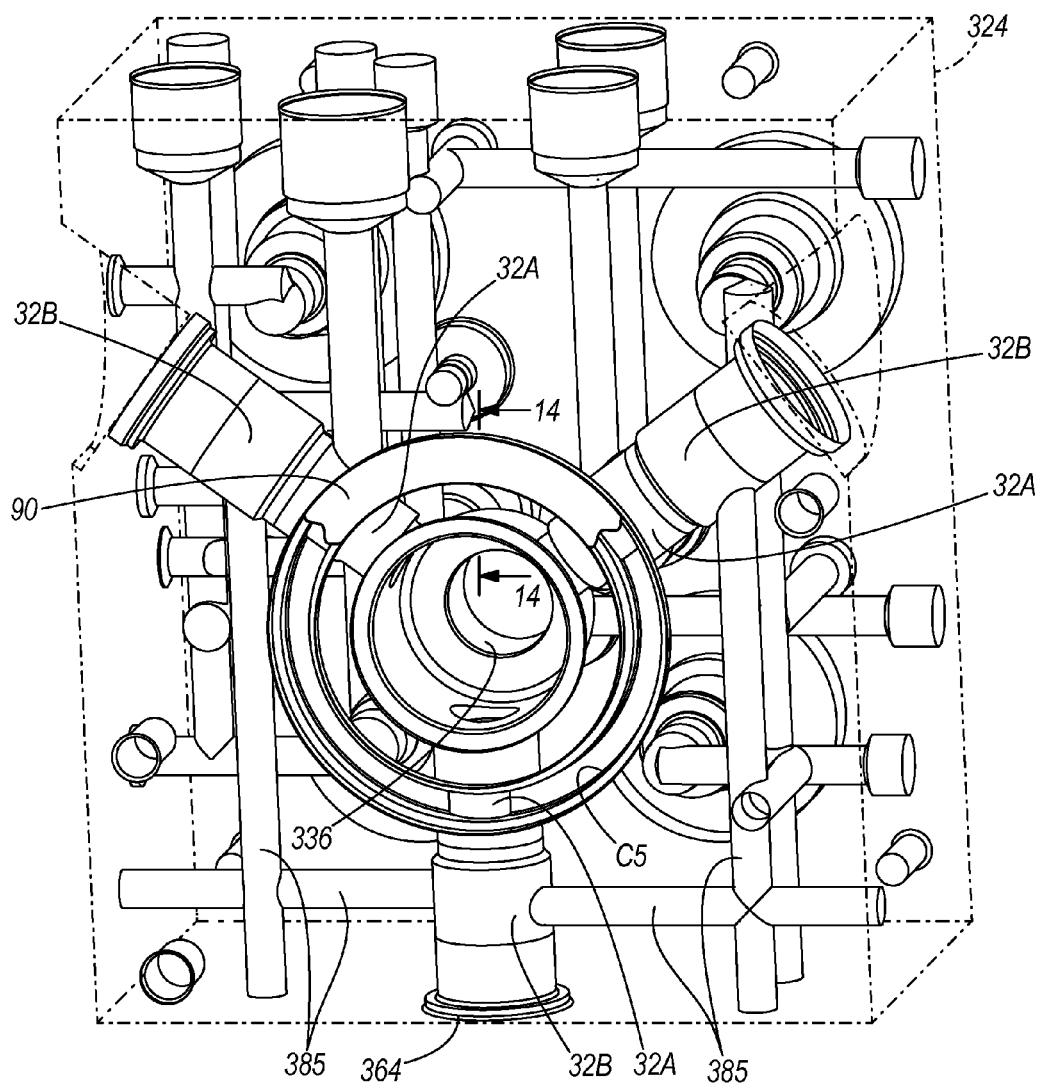
FIG. 12 is a first perspective view of another alternate pump housing for use with a hydraulic module like those of FIGS. 1 and 7. The exterior surfaces are rendered see-through to illustrate the internal passages within the pump housing. The pump housing includes a single surface channel of 360 degrees.
Figure 13:
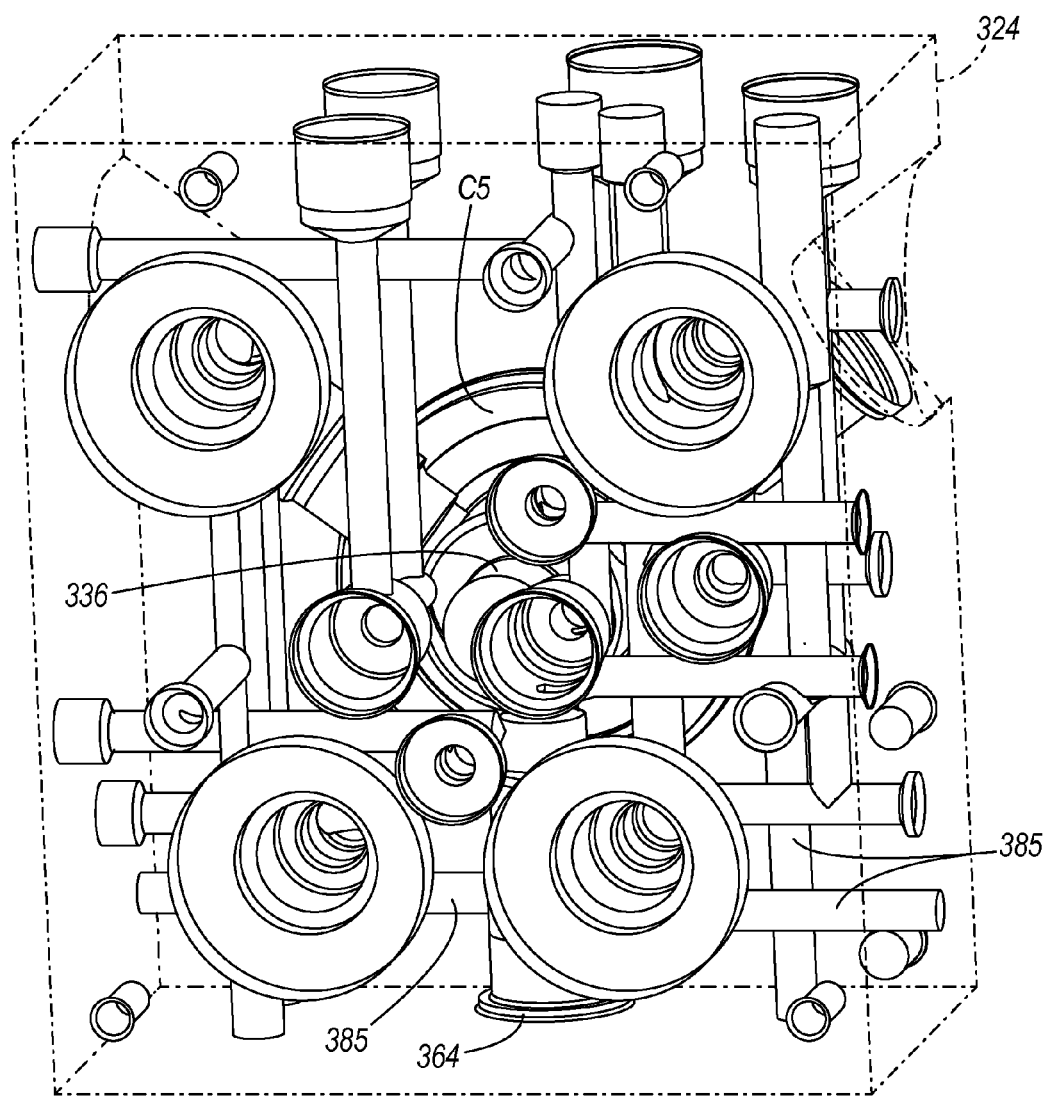
FIG. 13 is a second perspective view of the pump housing of FIG. 12, in which the exterior surfaces are rendered see-through to illustrate the internal passages within the pump housing.

FIGS. 12 and 13 illustrate another construction of a pump housing 324, which may be part of a hydraulic module as described above with respect to the preceding constructions. Like the other pump housings discussed above, three pump elements are positioned in three pump chambers 32 within the pump housing 324. The pump elements pressurize hydraulic fluid from the respective suction sides 32A of the pump chambers 32 to the pressure sides 32B of the pump chambers 32. However, in the pump housing 324 of FIGS. 12 and 13 only a single channel C5 is formed in the exterior surface 340 where the motor M is coupled. The channel C5 is illustrated as a 360-degree annular channel, but in other constructions, the channel C5 may take another shape, which may not be arcuate and/or may not extend a full 360 degrees. In the illustrated construction, the channel C5 couples the suction side 32A of each of the pump chambers 32 together in fluid communication. The pressure sides 32B are coupled with each other in fluid communication by machined passages internal to the pump housing 324. In this way, the sealing requirements of the channel C5 are drastically reduced, as the suction sides 32A of the pump chambers 32 may see a relatively small pressure (e.g., 1 bar) during operation as compared to the pressure sides 32B which may see much higher pressures of over 100 bar or over 200 bar (e.g., 250 bar to 350 bar, in some constructions). Although the pump housing 324 of FIGS. 12 and 13 does not take full advantage of the surface-provided channels of some of the other constructions since the pressure sides 32B of the various pump chambers 32 are coupled with each other and the outlet 364 via internal machine passages 385, an advantage is still provided by simplifying the connection among the suctions sides 32A of the pump chambers 32.

Figure 14A:
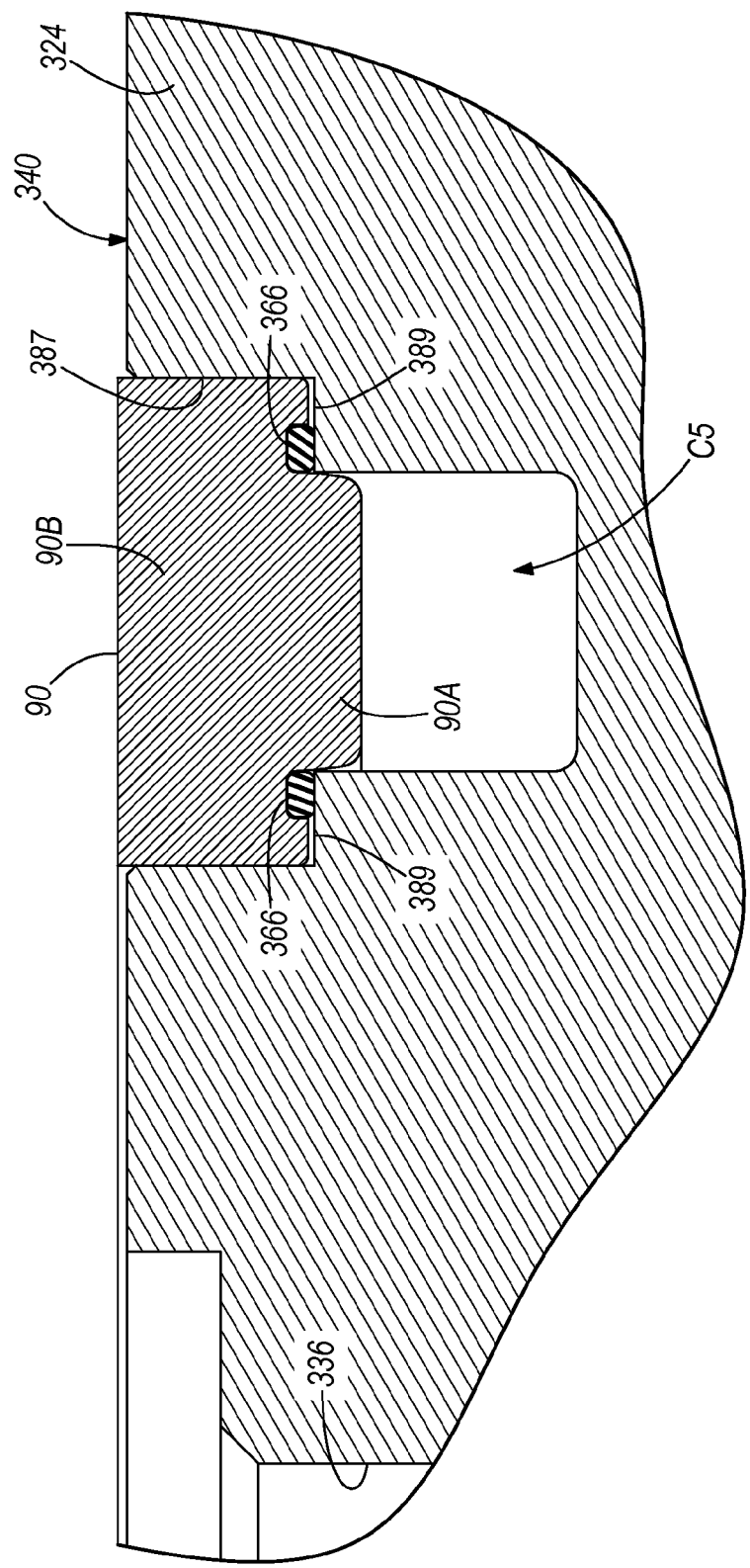
FIG. 14A is a cross-sectional view taken along line 14-14 of the pump housing of FIG. 12 to illustrate the surface channel being closed by one type of closure.

FIG. 14A illustrates a cross-section of an exemplary closure 90 illustrated in FIG. 12 to close the channel C5. It should be understood that similar closures may also be provided for any of the channels C1-C4 disclosed herein. The closure 90 is generally circular to match the shape of the circular channel C5, but it should be understood that the closure 90 can be modified to match the shape of an alternately-shaped channel, such as the channels C1, C2 of FIG. 2. The closure 90 has an insertion side facing into the channel C5 and an opposite exterior side. The insertion side includes an insertion portion 90A, which has a tapered shape and at least partially fits within the channel C5 when the closure 90 is in the closed or secured position of FIG. 14A. Toward the exterior side of the insertion portion 90A, the closure 90 includes a head portion 90B, which has a larger width (in a left-right direction in FIG. 14A) than the insertion portion 90A. The head portion 90B generally fits within a recess 387 formed directly adjacent the channel C5. Where the recess 387 meets the channel C5, two shoulders 389 are formed. The head portion 90B compresses a pair of seal members 366 (e.g., O-rings corresponding to the minor and major diameters of the channel C5) against the two shoulders 389 to seal the channel C5 from the outside atmosphere. The closure 90 can be configured so that the head portion 90B protrudes outwardly from the exterior surface 340 of the pump housing 324 when the seal members 366 are uncompressed between the closure 90 and the shoulders 389. Upon assembly of the motor M to the exterior surface 340, the seal members 366 are compressed and the amount of protrusion of the head portion 90B from the exterior surface 340 is reduced or eliminated completely. Thus, the closure 90 and the seal members 366 are sandwiched between the pump housing 324 and the motor M, and clamped therebetween to compress the seal members 366 and improve the seals. Of course, in a construction as shown in FIG. 2, the closure 90 can cooperate with a single seal member to seal a channel extending less than 360 degrees along the exterior surface 340.

Figure 14B:
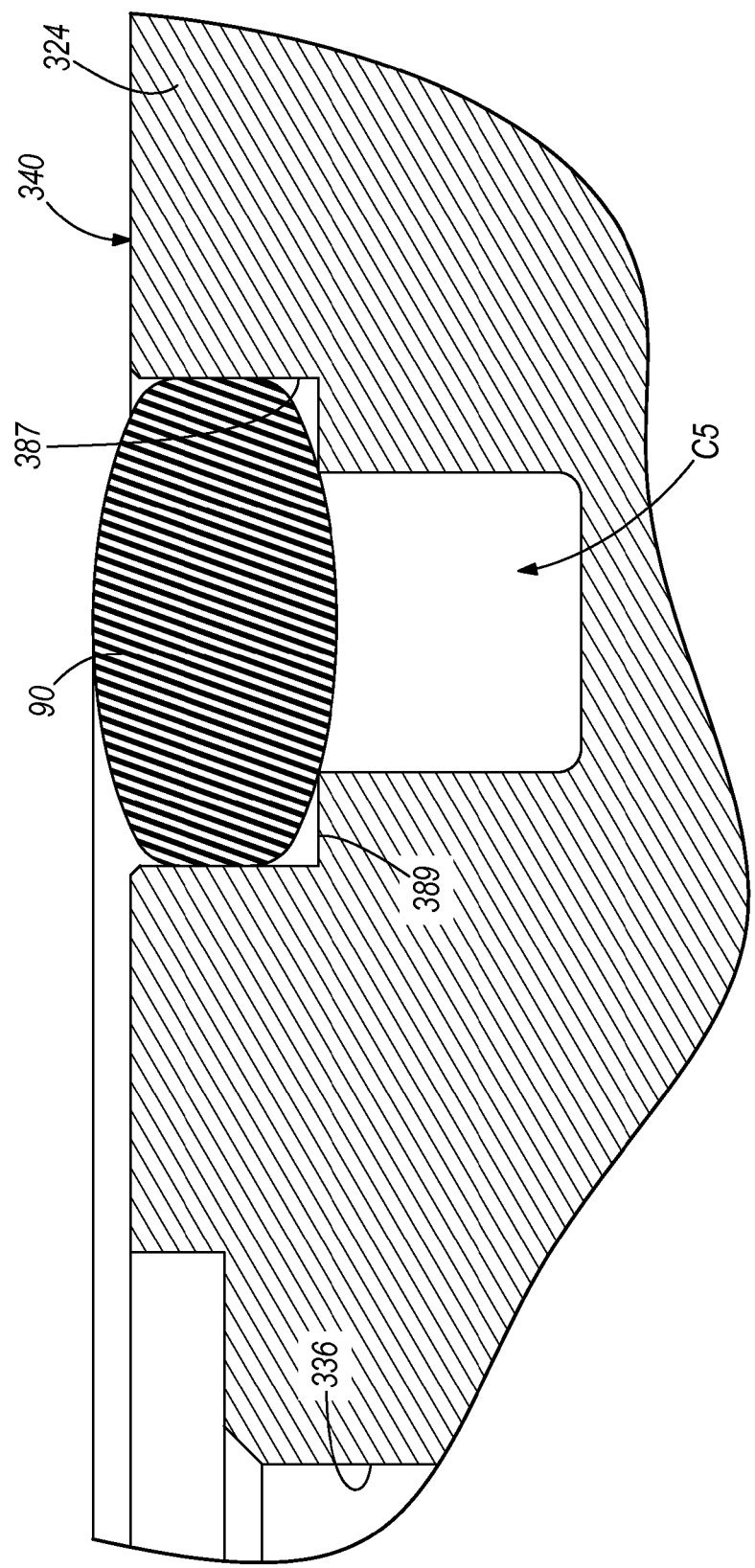
FIG. 14B is a cross-sectional view taken along line 14-14 of the pump housing of FIG. 12 to illustrate the surface channel being closed by another type of closure.

FIG. 14B illustrates a cross-section of another construction of the closure 90 illustrated in FIG. 12 to close the channel C5. It should be understood that similar closures may also be provided for any of the channels C1-C4 disclosed herein. The closure 90 is generally circular to match the shape of the circular channel C5, but it should be understood that the closure 90 can be modified to match the shape of an alternately-shaped channel, such as the channels C1, C2 of FIG. 2. Rather than a separate closure and seal member(s), the closure 90 of FIG. 14B is simply constructed as an seal member (e.g., a unitary elastomeric seal member, which may be an O-ring in some constructions). The closure 90 generally fits within a recess 387 formed directly adjacent the channel C5. Where the recess 387 meets the channel C5, two shoulders 389 are formed. The closure 90 rests against the two shoulders 389 to seal the channel C5 from the outside atmosphere. The closure 90 can be configured so that it protrudes outwardly from the exterior surface 340 of the pump housing 324 when contacting the shoulders 389 in an uncompressed state. Upon assembly of the motor M to the exterior surface 340, the closure 90 is compressed and the amount of protrusion of the closure 90 from the exterior surface 340 is reduced or eliminated completely. Thus, the closure 90 is sandwiched between the pump housing 324 and the motor M, and clamped therebetween. Of course, the closure 90 can be provided in any particular shape to correspond to the shape of the respective channel, which in some constructions may extend less than 360 degrees along the exterior surface 340.

Various features and advantages of the invention are set forth in the following claims.

What is claimed is:

1. A hydraulic module comprising:
   a pump housing having an exterior surface, an opening in communication with the exterior surface, and a plurality of pump chambers in communication with the opening;
   a plurality of pump elements corresponding to the plurality of pump chambers, each of the plurality of pump elements being movable within a respective one of the pump chambers to increase the pressure in a fluid from a suction side of the pump chamber to a pressure side of the pump chamber;
   a motor having an output member extending into the opening of the pump housing and being coupled with the plurality of pump elements; and
   a channel formed in the exterior surface of the pump housing, the channel establishing fluid communication between the plurality of pump chambers.

2. The hydraulic module of claim 1, wherein the channel establishes fluid communication among the suction sides of the plurality of pump chambers.

3. The hydraulic module of claim 2, further comprising a second channel formed in the exterior surface of the pump housing, the second channel establishing fluid communication among the pressure sides of the plurality of pump chambers.

4. The hydraulic module of claim 3, wherein the two channels extend along concentric arcuate paths on the exterior surface.

5. The hydraulic module of claim 1, wherein the channel extends along an arcuate path of at least 180 degrees on the exterior surface.

6. The hydraulic module of claim 5, wherein the channel extends along an arcuate path of about 270 degrees on the exterior surface.

7. The hydraulic module of claim 6, wherein the plurality of pump chambers includes three pump chambers extending radially from an axis of the opening, with even spacing therebetween.

8. The hydraulic module of claim 5, wherein the channel extends along an arcuate path of 360 degrees on the exterior surface.

9. The hydraulic module of claim 1, wherein the motor is secured to the exterior surface on a first side of the pump housing, the pump housing including a second side opposite the first side, and the pump housing further comprising an aperture extending between the first and second sides and receiving a pair of power leads from the motor.

10. The hydraulic module of claim 9, wherein the channel extends along an arcuate path of less than 360 degrees on the exterior surface and the aperture is located on the exterior surface at a position intersecting with a 360-degree extrapolation of the arcuate path.

11. The hydraulic module of claim 1, further comprising a closure generally conforming to the shape of the channel on the exterior surface, the closure being positionable in a secured position against the pump housing to enclose the channel.

12. The hydraulic module of claim 11, wherein the closure includes an insertion side and an opposite exterior side, and wherein the closure has a cross-sectional width that is tapered toward the insertion side.

13. The hydraulic module of claim 11, further comprising a seal member positioned between the closure and a seal surface of the pump housing adjacent the channel.

14. The hydraulic module of claim 11, wherein the motor is secured to the exterior surface of the pump housing, the closure being held in the secured position by being assembled and clamped between the motor and the exterior surface of the pump housing.

15. A hydraulic module comprising:
a pump housing having an exterior surface, an opening in communication with the exterior surface, and a pump chamber in communication with the opening;
a pump element movable within the pump chamber to increase the pressure in a fluid from a suction side of the pump chamber to a pressure side of the pump chamber;
a motor having an output member extending into the opening of the pump housing and being coupled with the pump element;
a channel formed in the exterior surface of the pump housing, the channel being in fluid communication with the pump chamber; and
a closure generally conforming to the shape of the channel on the exterior surface, the closure being positionable in a secured position against the pump housing to enclose the channel,
wherein the motor is secured to the exterior surface of the pump housing, the closure being held in the secured position by being assembled and clamped between the motor and the exterior surface of the pump housing.

16. The hydraulic module of claim 15, wherein the pump element movable within the pump chamber is one of a plurality of pump elements, each movable within a respective one of a plurality of pump chambers, and wherein the channel establishes fluid communication between the plurality of pump chambers.

17. The hydraulic module of claim 16, wherein the channel establishes fluid communication among respective suction sides of the plurality of pump chambers, the hydraulic module further comprising a second channel formed in the exterior surface of the pump housing and establishing fluid communication among respective pressure sides of the plurality of pump chambers.

18. The hydraulic module of claim 17, wherein the first and second channels extend along concentric arcuate paths on the exterior surface.

19. The hydraulic module of claim 15, further comprising a seal member positioned between the closure and a seal surface of the pump housing adjacent the channel, the seal member being compressed when the closure is held in the secured position.

20. The hydraulic module of claim 15, wherein the motor is secured to the exterior surface on a first side of the pump housing, the pump housing including a second side opposite the first side, and the pump housing further comprising an aperture extending between the first and second sides and receiving a pair of power leads from the motor, and wherein the channel extends along an arcuate path of less than 360 degrees on the exterior surface and the aperture is located on the exterior surface at a position intersecting with a 360-degree extrapolation of the arcuate path.

* * * * *